(12) United States Patent
Burger et al.

(10) Patent No.: US 12,247,664 B2
(45) Date of Patent: Mar. 11, 2025

(54) SEALING ARRANGEMENT HAVING A ROD SEAL, OUTPUT APPARATUS FOR DISCHARGING A FLOWABLE MEDIUM AND ROD SEAL

(71) Applicant: ROBATECH AG, Muri (CH)

(72) Inventors: Thomas Burger, Zug (CH); Beatus Ineichen, Weggis (CH); Claudio Hofer, Cham (CH)

(73) Assignee: ROBATECH AG, Muri (CH)

( * ) Notice: Subject to any disclaimer, the term of this patent is extended or adjusted under 35 U.S.C. 154(b) by 100 days.

(21) Appl. No.: 17/939,065

(22) Filed: Sep. 7, 2022

(65) Prior Publication Data

US 2023/0072100 A1 Mar. 9, 2023

(30) Foreign Application Priority Data

Sep. 8, 2021 (EP) .................................. 21 195 568

(51) Int. Cl.
*F16J 15/3236* (2016.01)

(52) U.S. Cl.
CPC ................................. *F16J 15/3236* (2013.01)

(58) Field of Classification Search
CPC ....... F16J 15/3236; F16J 15/3232; F16J 15/16
See application file for complete search history.

(56) References Cited

U.S. PATENT DOCUMENTS 3,057,630 A * 10/1962 Sneed .................. F16J 15/3208
  277/436
3,970,321 A * 7/1976 Dechavanne ........ F16J 15/3208
  277/572

(Continued)

FOREIGN PATENT DOCUMENTS

| DE | 2348868 A1 | 6/1974 |
| DE | 3738988 A1 | 6/1989 |
| DE | 102013212961 A1 | 1/2015 |

OTHER PUBLICATIONS

Europäisches Patentamt (European Patent Office), Europäischer Recherchenbericht (European Search Report), Feb. 10, 2022 (Feb. 10, 2022), 2 pages, European Patent Office, Munchen, Germany (DE).

*Primary Examiner* — Eugene G Byrd (74) *Attorney, Agent, or Firm* — NK Patent Law (57) ABSTRACT

A sealing arrangement having a rod seal for sealing a cavity for a flowable medium in the region of a rod includes an output apparatus for discharging the flowable medium. The rod is movably supported in a housing to be displaced in an axial direction. The housing has a bearing portion, wherein the rod seal is supported in a fixed manner and wherein the rod extends through the bearing portion and the rod seal so that a first rod portion and a second rod portion are arranged at different sides of the bearing portion. The first rod portion is located at a side facing the cavity and the second rod portion is located at a side facing away from the cavity. The rod seal is arranged at the side of the bearing portion facing the first rod portion and has a first sealing lip and a second sealing lip that are spaced apart from each other in the axial direction and circumferentially contact the rod. The bearing portion facing the cavity has a discharge structure having a support face which circumferentially surrounds the rod. The rod seal is in abutment with the support face and the support face has a diameter which increases in the direction of the second rod portion.

13 Claims, 5 Drawing Sheets

(56) References Cited

U.S. PATENT DOCUMENTS

| | | | | |
|---|---|---|---|---|
| 4,239,244 | A | * | 12/1980 | Brent ..................... F16J 15/32 |
| | | | | 277/584 |
| 4,560,174 | A | * | 12/1985 | Bisi ..................... B62D 55/088 |
| | | | | 277/910 |
| 4,709,932 | A | | 12/1987 | Edlund et al. |
| 4,953,876 | A | | 9/1990 | Müller |
| 5,149,107 | A | * | 9/1992 | Maringer ............. F16J 15/3208 |
| | | | | 277/560 |
| 5,257,432 | A | * | 11/1993 | Duke .................. F16J 15/3208 |
| | | | | 15/104.04 |
| 6,811,156 | B2 | * | 11/2004 | Adrian .................... F16F 9/36 |
| | | | | 277/435 |
| 8,287,737 | B2 | * | 10/2012 | Bielawski ............ F16J 15/3208 |
| | | | | 210/656 |
| 9,933,071 | B2 | * | 4/2018 | Ryther ................. F16J 15/3208 |
| 10,052,748 | B2 | * | 8/2018 | Escolle ....................... F16J 9/20 |
| 10,443,733 | B2 | * | 10/2019 | James .................. F16J 15/3276 |
| 10,794,490 | B2 | * | 10/2020 | Mountz .................. F16J 15/164 |
| 10,801,622 | B2 | * | 10/2020 | Foster .................. F16J 15/027 |
| 2006/0066058 | A1 | * | 3/2006 | Holt ..................... F16J 15/3208 |
| | | | | 277/584 |
| 2006/0214380 | A1 | * | 9/2006 | Dietle ................. F16J 15/3244 |
| | | | | 277/559 |
| 2019/0107203 | A1 | | 4/2019 | James et al. |
| 2021/0222508 | A1 | * | 7/2021 | Pallini ................... F16J 15/028 |

\* cited by examiner

SEALING ARRANGEMENT HAVING A ROD SEAL, OUTPUT APPARATUS FOR DISCHARGING A FLOWABLE MEDIUM AND ROD SEAL

FIELD OF THE INVENTION

The present invention relates to a sealing arrangement having a rod seal for sealing a cavity for a flowable medium in the region of a rod. In addition, the invention relates to an output apparatus for discharging a flowable medium, in particular an output apparatus for discharging an adhesive. Furthermore, the present invention relates to a rod seal. The flowable medium is preferably a hot adhesive or a melt adhesive. The output apparatus is in particular an application head, in particular an injection head or spray head or coating head.

Sealing arrangements having a rod seal are used in particular in sectors in which a region of a housing which contains a flowable medium is intended to be sealed in the region of a rod which can be moved relative to the housing. In rods which carry out a rotating movement, if they are constructed as a shaft, so-called radial shaft sealing rings are often used. The rod may, however, also be a rod which carries out a translational movement, such as, for example, a piston rod of a piston pump or a valve rod.

DE 10 2013 212 961 A1 discloses a rod seal in the form of a radial shaft sealing ring, wherein this radial shaft sealing ring is used to seal rotating shafts when they pass from an inner space of a housing into an outer space. The inner space typically contains in this instance a fluid or a lubricant, such as, for example, engine oil in radial shaft sealing rings which seal a crankshaft of a motor vehicle.

In the sector of radial shaft sealing rings, the use of dual lip sealing rings is known, wherein the radial shaft sealing ring has sealing lips which are formed to be spaced apart from each other in an axial direction and which contact the rod circumferentially, wherein the first sealing lip serves to actually seal the inner space with respect to the outer space and the other sealing lip acts as a dust protection. DE 2 348 868A discloses such a shaft seal.

For the purposes of sealing translationally movable rods, in principle sealing arrangements can be used in which the rod seal is supported in a fixed manner in the housing and the rod moves relative to a sealing portion of the rod seal, for example, a sealing lip of the rod seal which circumferentially abuts the rod. A disadvantage of this type of seal is that, over a long period of operation, the sealing portion becomes worn and as a result the sealing can lose its sealing effect, whereby undesirable discharge of flowable material from the cavity in the region of the rod can occur. In addition, it has been found that the reliable function of the sealing arrangement is highly dependent on the pressure and temperature of the medium located in the cavity.

A particular challenge for the sealing arrangement are temperature cycles. During the heating of a solid medium in order to make it flowable, as a result of material expansions local pressure peaks which may be a multiple of the pressure loading during operation may occur.

This particularly occurs when only a portion of the medium is liquefied and the remainder is still solid. Conventional sealing arrangements can thereby be slightly damaged. During the cooling, as a result of different material contractions, particularly caused by the transition of the medium from the liquid state into the solid state, additional loads on the sealing arrangement may be caused.

Translationally movable rods are used, for example, in output apparatuses, for example, in the form of application heads. Such output apparatuses are used, for example, to apply flowable medium in portions to a substrate. The application of the flowable medium is in this instance generally carried out in a controlled manner, wherein the apparatus has an output opening for discharging the flowable medium, wherein this output opening can be closed and opened by means of a sealing portion of a rod which can be moved with an actuator. Such an output apparatus thus has a closable valve.

With regard to such an output apparatus for discharging flowable medium, the problem involves sealing a region which contains the flowable medium in the region of the rod, in particular in order to prevent the flowable medium from reaching the region of an actuator or the drive which drives the rod. Between the cavity and the drive there is normally an intermediate space which is sealed at the side of the cavity and at the side of the drive. The sealing arrangement should also prevent the medium from reaching this intermediate space. If medium does reach this intermediate space, it is an indication that the sealing arrangement is worn. The valve can then be operated further for a limited time with the identifiable leakage. If the medium were to reach the drive directly, the drive would then become clogged in a short space of time and non-operational.

In the sealing arrangement according to the invention, a rod seal having at least two sealing lips is used in order to achieve a particularly good sealing action. The use of at least two sealing lips is considered to be advantageous in that, with an output apparatus for discharging a flowable medium, the flowable medium generally has a higher pressure compared with the environment. Generally, the flowable medium has an operating pressure of from 10 bar to 100 bar above ambient pressure which is generally approximately 1 bar. The first sealing lip which faces the flowable medium serves to seal with respect to the pressure of the medium. The first sealing lip may have a slight leak. The second sealing lip wipes this leak of the first sealing lip from the rod.

When a seal having two sealing lips is used, it has been found to be problematic that the pressing force of the two sealing lips on the rod is highly dependent on the pressure of the flowable medium which is intended to be sealed. The wear of the sealing lips becomes greater, the greater the pressure of the medium. It has additionally been found to be problematic that the distribution of the pressing forces of the two sealing lips is highly dependent on the pressure of the medium which is intended to be sealed. The sealing action becomes worse, the more these pressing forces differ. This results in the problem that the sealing action of the seal is not leak-free over the entire pressure, temperature and viscosity range. At a particularly low operating pressure of the flowable medium, for example, the pressing forces of the sealing lips are too low on the rod to ensure a reliable and leakage-free sealing.

In addition, in conventional dual lip seals there is the problem that they are generally constructed for a narrow field of use, that is to say, for a narrow pressure range, and therefore cannot be used universally. This results in a sealing arrangement having a conventional configuration and arrangement of the dual lip seal with regard to the operating pressure of the flowable medium being limited to a narrow range. If this narrow pressure range is left for higher pressures, the pressing forces on the sealing lips become too great with the result that the wear of the sealing lips is too great and the service-life is short. Temperature cycles in the form of heating and cooling with excessively high pressures also reduce the service-life of the sealing arrangement. If the narrow pressure range is left for lower pressures, the pressing forces on the sealing lips become too small so that a leak occurs.

Objects of the Invention

An object of the present invention is therefore to provide a sealing arrangement having a rod seal which overcomes the above-mentioned disadvantages, in particular a sealing arrangement which over a large pressure range achieves a reliable sealing action with low wear of the rod seal nonetheless. An object of invention is further to provide an output apparatus which serves to discharge the flowable medium having such a sealing arrangement. In addition, an object of the invention is to provide a corresponding rod seal. Preferably, the sealing arrangement should be suitable for exceptionally high cycle rates in the range of 500 million strokes and the service-life of the seal should be extremely high under the specific conditions of use.

These objects are achieved by a sealing arrangement which has the features of the present invention, an output apparatus which has the features of the present invention and a rod seal which has the features of the present invention.

SUMMARY OF THE INVENTION

The sealing arrangement according to the invention serves to seal a cavity which is formed in a housing in the region of a rod. The cavity serves to receive a flowable medium. The rod is supported in the housing so as to be able to be moved, preferably displaced, in an axial direction of the rod, in this regard in a translational manner. The housing has a bearing portion and a rod seal which is supported in a fixed manner in the bearing portion, wherein the rod extends through the bearing portion and the rod seal so that a first rod portion of the rod and a second rod portion of the rod are arranged at different sides of the bearing portion, wherein the first rod portion is located at a side of the bearing portion facing the cavity and wherein the second rod portion is arranged at a side of the bearing portion facing away from the cavity. The rod seal is arranged at the side of the bearing portion facing the cavity. The rod seal has at least a first sealing lip and a second sealing lip, wherein the sealing lips are spaced apart from each other in the axial direction and circumferentially contact the rod. The bearing portion has at the side thereof facing the cavity a discharge structure having a support face which circumferentially surrounds the rod for the rod seal, wherein the rod seal is in abutment with the support face. The support face has a diameter which increases in the direction of the second rod portion.

As a result of the fact that the support face has a diameter which increases in the direction of the second rod portion, the support face is configured in such a manner that it tapers in the direction of the cavity or the first rod portion, whereby forces which act on the support face in the direction of the second rod portion can be discharged radially outwards. This has the advantage that, as a result of the pressurised medium, forces acting on the rod seal are discharged radially outwards so that, as the pressure of the flowable medium increases, the resultant forces on the rod seal are at least partially discharged radially outwards so that a pressing force of the sealing lips, in particular the second sealing lip, on the rod increases to a lesser extent than would be the case if it were a planar support face or if the support face were to even have a diameter which decreases in the direction of the second rod portion and thus would have a funnel-like shape.

It has been found that, as a result of this configuration of the support face, a pressing force of the sealing lips on the rod can be kept substantially constant over a large pressure range of the flowable medium and in addition a ratio of the pressing force of the first sealing lip with respect to the pressing force of the second sealing lip remains substantially constant over a large pressure range of the flowable medium. In addition, the sealing arrangement according to the invention has also been found to be advantageous with regard to the most consistent possible pressing force even when the sealing lips become worn.

The flowable medium preferably has a temperature of from about 50° C. to about 250° C., preferably from about 100° C. to about 200° C. The operating pressure of the medium is preferably from about 10 bar to about 100 bar above the ambient pressure which is generally approximately 1 bar. The medium is preferably a viscous fluid. The viscosity of the flowable medium is preferably from about 0.1 Pascal-second (Pa-s) to about 100 Pa-s, preferably from about 0.5 Pa-s to about 10 Pa-s.

The flowable medium is preferably in particular a melt adhesive. However, it may also absolutely be a cold glue. The flowable medium may further also be a sealing agent or a lubricant.

The rod of the sealing arrangement is preferably a piston rod or a valve rod.

The sealing arrangement is preferably a component of a conveying apparatus for conveying the flowable medium. The conveyor device is preferably a piston pump, wherein the rod is the piston rod, wherein the flowable medium is conveyed by means of the displacement of the piston rod.

The sealing arrangement is preferably a component of an output apparatus for discharging the flowable medium. The output apparatus is preferably a metering valve of an application head.

The sealing arrangement may absolutely be a component of a valve, in particular an excess pressure valve.

The displacement of the rod is preferably carried out by means of a drive which is operationally connected to the rod, in particular to the second rod portion.

The output apparatus according to the invention serves to discharge the flowable medium. The output apparatus has the sealing arrangement according to the invention, wherein the output apparatus has a discharge opening which opens in the cavity for discharging the flowable medium in the cavity from the cavity, for example, in order to apply the medium to a substrate, wherein the rod is supported in the housing so as to be able to be moved between a first end position and a second end position in the axial direction, and vice versa, wherein the rod has a sealing portion, wherein the sealing portion closes the discharge opening in the first end position and is arranged in the second end position with spacing from the discharge opening so that flowable medium can be discharged from the discharge opening, wherein the discharge opening has a drive, wherein the drive is operationally connected to the rod, in particular to the second rod portion of the rod, in order to move the rod from the first end position into the second end position, and vice versa. The drive may, for example, be a pneumatic cylinder or hydraulic cylinder, wherein a piston or a piston rod of the pneumatic cylinder or hydraulic cylinder is connected to the rod. The rod may absolutely form the piston rod of the pneumatic cylinder or hydraulic cylinder.

The output apparatus according to the invention for discharging a flowable medium is in particular an output apparatus for discharging an adhesive, preferably for discharging a melt adhesive.

The flowable medium preferably has a temperature of from about 50° C. to about 250° C., preferably from about 100° C. to about 200° C. The operating pressure of the medium is preferably from about 10 bar to about 100 bar above ambient pressure, which is generally 1 bar. The viscosity of the flowable medium is preferably from about 0.1 Pa-s to about 100 Pa-s, preferably from about 0.5 Pa-s to about 10 Pa-s.

The output apparatus for discharging a flowable medium is in particular constructed to discharge the flowable medium in an intermittent manner. A switching frequency of the output apparatus is preferably up to about 150 Hz, in particular with a switching frequency of from about 1 Hz up to about 150 Hz.

The output apparatus is in particular in the form of a metering apparatus.

It is further considered to be particularly advantageous for the diameter of the support face to continuously increase in the direction of the second rod portion.

In particular, there is provision for the support face to be free from steps and/or edges and/or the like.

It is completely conceivable for the support face to have a plurality of sequential portions in the axial direction, for example, a plurality of conical portions with different opening angles.

It is further considered to be particularly advantageous for the support face to be free from planar faces, that is to say, faces which are constructed perpendicularly to a longitudinal axis of the rod which extends in an axial direction.

It is completely conceivable for the support force to be adjoined at the radially outer side and/or radially inner side by another face of the bearing portion, wherein this additional face does not necessarily have a diameter which increases in the direction of the second rod portion. It is, for example, conceivable for an annular planar face to adjoin the support face at the radially inner and/or radially outer side. In place of or in addition to planar faces or surface portions, rounded faces or radii may also be provided. It is also completely conceivable for the rod seal to be in abutment with this other face or these other faces.

Preferably, the support face forms the radially innermost face, with which the rod seal is in abutment. The redirection of the forces in a radially outward direction thereby already begins close to the rod.

Preferably, the rod seal is supported in the direction of the second rod portion exclusively on the support face so that over the entire contact face a force redirection is carried out in a radially outward direction. However, it is completely conceivable for the rod seal to also be supported in the direction of the second rod portion on surface sections of the bearing portion which are not constructed in the manner of the support face. For example, the bearing portion could have adjacent to the discharge structure planar surface portions which are consequently constructed perpendicularly to a longitudinal axis of the rod which extends in an axial direction.

When the rod seal is also supported on surface sections of the bearing portion which are not constructed in the manner of the support face, it is considered to be particularly advantageous for the face of the rod seal in abutment with the support face to be greater than the face of the rod seal in abutment with the remaining surface sections.

Preferably, a ratio of the largest diameter of the support face with respect to the smallest diameter of the support face is from about 1.5 to about 3.0.

It is considered to be particularly advantageous for the support face to be able to be described by a rotation face which is produced by means of rotation of a line about a rotation axis which is formed by the longitudinal axis of the rod. Preferably, the line is a straight line which is inclined with respect to the longitudinal axis. The rotation surface then corresponds to the covering face of a straight truncated cone, wherein an opening angle of the truncated cone corresponds to double the inclination angle of the straight line. However, the line may absolutely also be a curved line.

It is considered to be particularly advantageous for the support face of the covering face to correspond to a truncated cone with a circular base face. Such a support face can be produced in a particularly simple and cost-effective manner.

It is further considered to be particularly advantageous for an angle formed by the support face and a longitudinal axis of the rod to be less than about 90°, for example, from about 60° to about 85°, in particular from about 70° to about 80°. These angular ranges have been found to be particularly advantageous with respect to the most constant possible pressing force of the sealing lips on the rod over a particularly large pressure range of the flowable medium.

It is considered to be particularly advantageous for the sealing arrangement to have a resiliently deformable clamping element, wherein the clamping element is in circumferential abutment with a covering face of the rod seal facing away from the rod and presses the sealing lips against the rod. Preferably, the covering face surrounds the sealing lips circumferentially. Alternatively or additionally, it is also conceivable for the clamping element to be in abutment with the rod seal at a side of the rod seal facing away from the support face of the discharge structure and to press the rod seal against the support face of the discharge structure. The use of a clamping element has been found to be advantageous with regard to a particularly good sealing action, a long service-life and secure support of the rod seal in the housing, for example, the bearing portion. In particular, the assembly can also be carried out in a particularly simple manner, for example, the rod seal can first be introduced into the bearing portion of the housing and subsequently be fixed to the clamping element in the bearing portion.

In connection with a clamping element, it is considered to be particularly advantageous when the clamping element is supported in a bearing pocket formed by the bearing portion and/or by the rod seal, in particular a part-region of the bearing portion to engage behind the clamping element at a side facing the first rod portion and consequently a side facing the cavity.

The bearing pocket is preferably constructed to be open in the direction of the cavity. The assembly and disassembly of the rod seal are thereby facilitated.

The clamping element is preferably supported at the radial outer side on the bearing portion.

It is considered to be particularly advantageous for the rod seal to be constructed in one piece.

In particular, the rod seal comprises a single material. In this regard, the rod seal is free from additional material components, such as, for example, a reinforcement ring, as provided, for example, in radial shaft sealing rings. The single material may absolutely be a mixture of two different elastomer materials with different hardnesses.

However, it is also completely conceivable for the rod seal to have regions which comprise different materials, in particular different elastomer materials with different hardnesses.

It is considered to be particularly advantageous with regard to a most homogeneous possible pressing pressure of the first sealing lip and the second sealing lip against the rod seal for the covering face of the rod seal, with which the clamping element is in abutment, in an initial state of the rod seal, consequently in a non-deformed state, to have a diameter which increases in the direction of the first rod portion. The covering face in the initial state of the rod seal is thus configured in such a manner that it tapers in the direction of the second rod portion. Preferably, the covering face of the rod seal corresponds to the covering face of a truncated cone having a circular base face. It is considered to be particularly advantageous for an angle formed by the covering face of the rod seal and the longitudinal axis of the rod to be from about 2° to about 15°, in particular from about 3° to about 8°, in a particularly preferred manner from about 4° to about 6°. Such a configuration promotes a deformation of the rod seal when the clamping element is used in such a manner that at least a minimal pressing force of the sealing lips is achieved at particularly low pressures of the flowable medium so that the sealing action is also sufficient at low pressures of the flowable medium and nonetheless the pressing forces do not become too high at high pressures of the flowable medium.

It is considered to be advantageous for the material of the clamping element to have a lower Shore hardness than a material of the rod seal. The use of a lower Shore hardness for the clamping element and a higher Shore hardness for the seal produces in the combination the most consistent possible pressing force of the sealing lips against the rod seal over a large pressure range of the flowable medium. In addition, this combination has been found to be particularly advantageous with regard to low wear of the rod seal. It is assumed that a clamping element with a lower Shore hardness can absorb the forces which are discharged radially outwards at the support face particularly well by means of deformation and in this manner contributes to a small change of the pressing forces of the sealing lips over a large pressure range of the flowable medium.

It is considered to be particularly advantageous for the clamping element to be in the form of a sealing ring. The sealing ring is preferably in sealing abutment with the bearing portion at the radially outer side and in sealing abutment with the rod seal at the radially inner side. The use of a sealing ring has the advantage that, on the one hand, a sealing action to prevent the penetration of the flowable medium into the region between the clamping element and the rod seal is prevented. A penetration of flowable medium into this region is more disadvantageous particularly when the flowable medium is a medium which is subjected to an ageing process or even a hardening process, as is the case, for example, with melt adhesive. Hardened medium could, for example, have a negative effect on the resilience or the deformability of the rod seal, particularly when melt adhesive hardens in the bearing pocket since the volume of the bearing pocket is then no longer completely available for the deformation of the rod seal.

Preferably, the sealing ring has four projections in cross section. The sealing ring is in particular in the form of an X-ring or a quad ring.

It is considered to be particularly advantageous for the clamping element to have two radially inwardly protruding projections, wherein the sealing ring is arranged in such a manner that one projection acts on the first sealing lip in such a manner that the first sealing lip is pressed against the rod and the other projection acts on the second sealing lip in such a manner that the second sealing lip is pressed against the rod. A particularly good and homogeneous sealing action and a particularly constant pressing force of the sealing lips is thus ensured over a large pressure range of the flowable medium.

It is considered to be particularly advantageous for the clamping element to contact the bearing portion directly at the radially outer side.

It is further considered to be particularly advantageous for a hollow space which is open in the direction of the cavity to be formed between the rod seal and the bearing portion or for the rod seal to have a hollow space which is open in the direction of the cavity, wherein the clamping element, in particular the sealing ring, seals this hollow space with respect to the cavity, in particular the clamping element fills this hollow space. The hollow space may in particular form the bearing pocket or a part-region of the bearing pocket.

It is considered to be particularly advantageous for an abutment portion, which is in abutment with the support face, of the rod seal to protrude radially outwards with respect to a sealing portion of the rod seal, which sealing portion has the sealing lips and is adjacent in the axial direction.

A ratio of a maximum outer diameter of the abutment portion with respect to a maximum outer diameter of the sealing portion is preferably from about 1.2 to about 2.

With regard to the bearing portion, it is considered to be particularly advantageous for the bearing portion to be a component of a bearing sleeve which is releasably connected to the remaining housing, wherein the rod extends through the bearing sleeve.

Preferably, the sealing ring and/or the rod seal comprise an elastomer material, preferably different elastomer materials.

Preferably, a material of the rod seal has a hardness of from about 50 Shore D to about 65 Shore D and/or a material of the clamping element has a hardness of from about 60 Shore A to about 80 Shore A.

A travel path of the rod, for example, from the first end position into the second end position, is preferably at least about 0.2 mm, in particular from about 0.2 mm to about 2 mm, in a particularly preferred manner from about 0.3 mm to about 0.5 mm.

A diameter of the rod is preferably from about 1 mm to about 12 mm, in particular from about 2.5 mm to about 6 mm.

The material of the rod seal is in particular PTFE, filled PTFE or fluoropolymers. The material of the clamping element is in particular fluorinated rubber, preferably fluorocarbon rubber (FKM).

The rod seal according to the invention has a center axis which extends in an axial direction and at least two radially inwardly directed sealing lips which are spaced apart from each other in the axial direction and which circumferentially surround the center axis, wherein the rod seal has two ends which are opposite each other in the axial direction, wherein one end of the two ends has an end face which circumferentially surrounds the center axis for end-side support of the rod seal on an external support face, wherein the end face has a diameter which decreases in the direction of the other end of the two ends. The end face thus tapers in a funnel-like manner in the direction of the other end.

The external support face may, for example, be the support face of the discharge structure.

The external support face may in particular be a support face which is inclined in the direction towards the center axis.

The end face preferably corresponds to the covering face of a truncated cone having a circular base face. In particular, an angle defined between the cone axis and a surface line of the cone is from about 60° to about 85°.

It has been found to be particularly advantageous for the end face to merge into the second sealing lip.

Preferably, the rod seal has at a side facing away from the center axis, consequently radially outwards, a covering face which circumferentially surrounds the center axis, wherein the covering face has a diameter which increases in the direction towards the other end. The covering face thus tapers in the direction of one end.

Preferably, the second sealing lip is formed in the axial direction between the first sealing lip and the end face.

Preferably, the end face and the covering face of the rod seal are formed to be spaced apart from each other in the axial direction and consequently do not overlap. Preferably, the second sealing lip is formed in the axial direction between the covering face of the rod seal and the end face of the rod seal. This has been found to be particularly advantageous with regard to the sealing action with different medium pressures.

It is considered to be advantageous for an angle enclosed by the end face and the center axis to be from about 60° to about 85°, in particular from about 70° to about 80°, and/or for an angle enclosed by the covering face and the center axis to be from about 2° to about 15°, in particular from about 3° to about 8°, in a particularly preferred manner from about 4° to about 6°.

Preferably the rod seal has recesses, in particular for receiving the projections of the clamping element. In particular, the abutment portion has two recesses which circumferentially surround the center axis for receiving a protruding projection, which circumferentially surrounds the rod in each case, of the clamping element.

It is considered to be particularly advantageous for the rod seal and/or the bearing portion and/or the support face of the discharge structure and/or the end face of the rod seal and/or the covering face of the rod seal to be formed in a rotationally symmetrical manner with respect to the longitudinal axis of the rod or the center axis of the rod seal.

It is further considered to be particularly advantageous if, in an initial state of the rod seal, consequently in a state in which the rod seal is not supported in the bearing portion, a ratio between a first inner diameter in the region of the first sealing lip and a second inner diameter in the region of the second sealing lip to be from about 0.9 to about 1.1, preferably about 1.0.

Preferably, the sealing lips have different geometries.

The statements relating to the sealing arrangement according to the invention and the advantageous embodiments thereof apply accordingly to the output apparatus and the rod seal. The statements relating to the output apparatus according to the invention and the advantageous embodiments thereof apply accordingly to the sealing arrangement and the rod seal. The statements relating to the rod seal according to the invention and the advantageous embodiments thereof apply accordingly to the sealing arrangement and the output apparatus.

BRIEF DESCRIPTION OF THE DRAWING FIGURES

In the accompanying drawing figures, the invention is illustrated in greater detail with reference to one or more exemplary embodiments without being limited thereto.

DETAILED DESCRIPTION OF EXEMPLARY EMBODIMENTS

Figure 1:
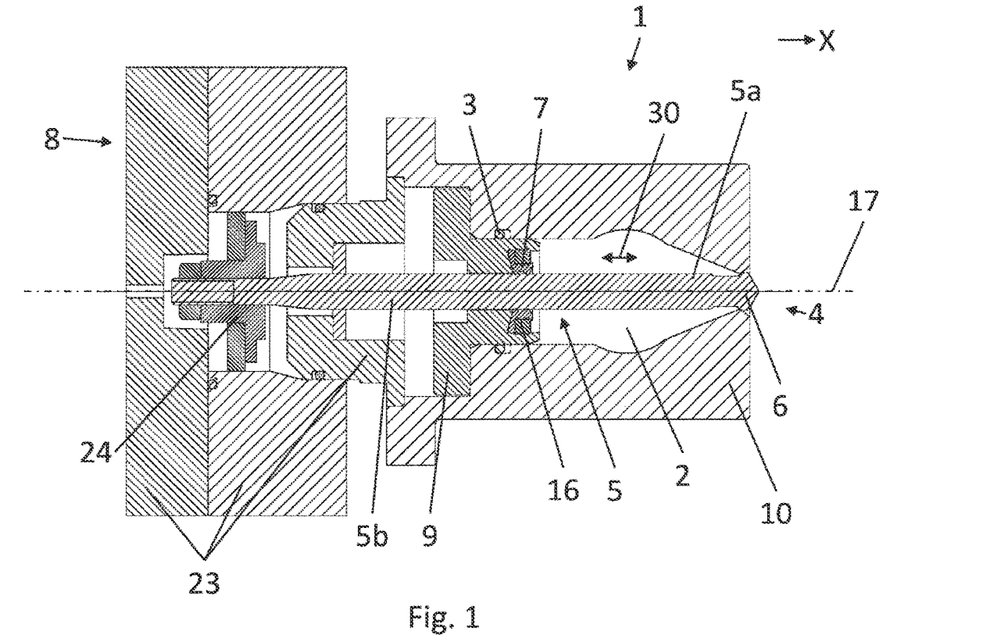
FIG. 1 shows a sectioned view of an exemplary embodiment of an output apparatus with a sealing arrangement according to the invention.
Figure 2A:
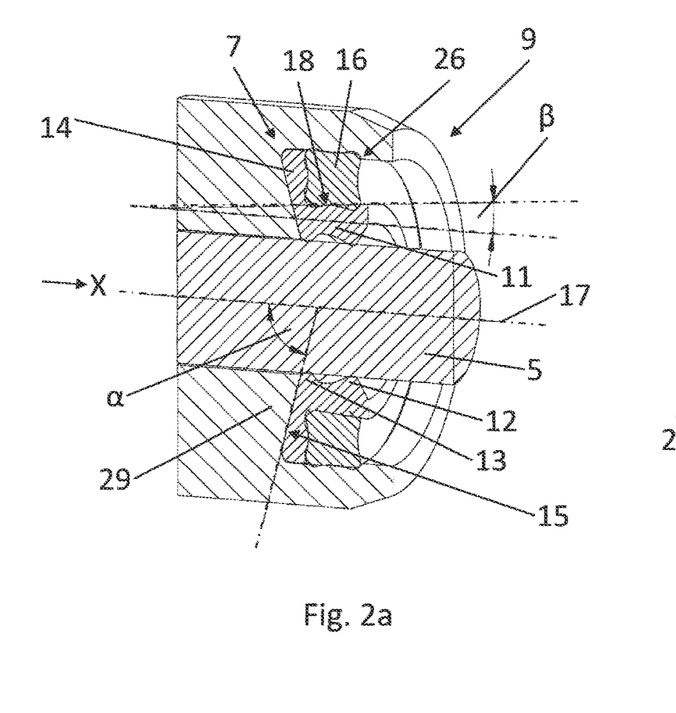
FIG. 2a shows a sectioned view of the sealing arrangement of the output apparatus according to FIG. 1.
Figure 10:
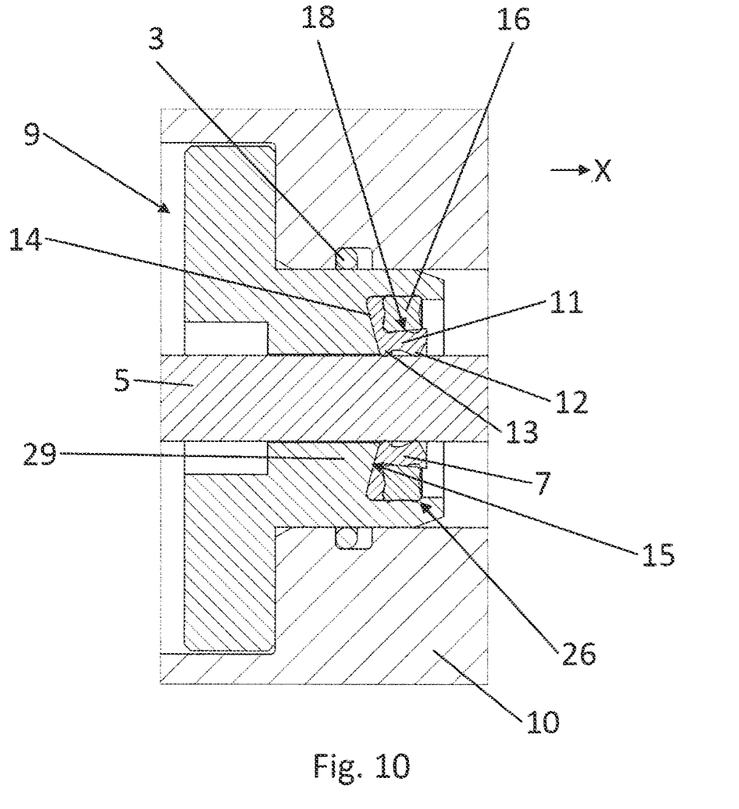
FIG. 10 shows a part-region of FIG. 1 as an enlarged illustration.

FIG. 1 shows an output apparatus 1 for discharging a flowable medium, in this instance an adhesive output apparatus, having an embodiment of the sealing arrangement according to the invention. The sealing arrangement per se is illustrated in greater detail in FIG. 2a and FIG. 10.

The output apparatus 1 serves to intermittently discharge the adhesive at a switching frequency of up to about 150 Hz. The output apparatus 1 has a housing 9, 10 having a cavity 2 for receiving the flowable medium. The housing 9, 10 has a first housing portion 10 and a second housing portion 9 in the form of a bearing sleeve, wherein the cavity 2 for receiving the flowable medium is formed between the housing portion 10 and the housing portion 9. A discharge opening 4 which opens into the cavity 2 for discharging the flowable medium is formed in the housing portion 10. The discharge opening 4 serves to apply the flowable medium to a substrate, which is not illustrated. The housing portion 9 is releasably connected to the housing portion 10, in this instance screwed to the housing portion 10. Between the housing portion 9 and the housing portion 10, a static seal, in this instance a sealing ring 3, is arranged in order to seal the cavity 2 in the region between the two housing portions 9, 10.

The output apparatus 1 has a rod 5, wherein the rod 5 is supported in the housing 9, 10 so as to be able to be moved between a first end position and a second end position in the axial direction X along a longitudinal axis 17 of the rod 5, and vice versa, wherein the rod 5 extends through the second housing portion 9 which is in the form of a bearing sleeve in the axial direction X. The movement of the rod 5 is indicated by the double-headed arrow 30 in FIG. 1. A first rod portion 5a of the rod 5 is arranged at a side of the second housing portion 9 facing the cavity 2 and a second portion 5b of the rod 5 is arranged at a side of the second housing portion 9 facing away from the cavity 2. Depending on the position of the rod 5, a differently sized proportion of the rod 5 is arranged at the respective side of the second housing portion 9. The first rod portion 5a has a sealing portion 6, wherein the sealing portion 6 in the first end position closes the discharge opening 4 at a side facing away from the cavity 2. In the second end position, the sealing portion 6 is arranged to be spaced apart from the discharge opening 4. Since the flowable medium located in the cavity 2 is under a higher pressure than the environment, flowable medium flows out of the discharge opening 4 in the second end position. Consequently, the flowable medium is discharged in the second end position of the rod 5. In this instance, the switching is carried out at a relatively high switching frequency in the range from about 1 Hz up to about 150 Hz, wherein the switching frequency relates to the time interval of two successive first end positions. Consequently, a switching frequency of about 1 Hz corresponds to an adhesive application which lasts for about 1 second. At higher switching frequencies, the duration of the respective adhesive application is accordingly shortened. It is completely conceivable for the time interval between two successive adhesive applications to be several seconds. This may, for example, be necessary when several substrates are conveyed one after the other on a conveyor belt past the discharge opening in order to apply the flowable medium thereto. The output apparatus 1 is in this instance generally timed in such a manner that flowable medium is discharged only when a substrate is located in the application region of the discharge opening. FIG. 1 shows the rod 5 in the first end position.

The output apparatus 1 has a pneumatic drive 8 having a drive housing 23 which is connected to the first housing portion 10, wherein the rod 5 protrudes with the second rod portion 5b into the drive housing 23. The drive 8 is operationally connected to the second rod portion 5b of the rod 5 in order to move the rod 5 from the first end position into the second end position, and vice versa. In this instance, a piston 24, which can be acted on with compressed air, of the drive 8 is connected in the region of a free end of the second rod portion 5b to the second rod portion 5b.

In a bearing portion 9 which in this instance is formed by the second housing portion 9 in the form of a bearing sleeve, a rod seal 7 is supported in a fixed manner, wherein the rod 5 extends through the rod seal 7 in the axial direction X. The rod 5 moves relative to the housing 9, 10 so that the rod seal 7 forms a dynamic seal. The rod seal 7 has a sealing portion 11 which circumferentially surrounds the rod 5 and which has a first sealing lip 12 and a second sealing lip 13. The first sealing lip 12 is in this instance formed between the cavity 2 and the second sealing lip 13. Accordingly, the sealing lips 12, 13 are spaced apart from each other in the axial direction X. The two sealing lips 12, 13 contact the rod 5 circumferentially. The rod 5 moves during its translational movement relative to the sealing lips 12, 13.

The bearing portion 9 has a discharge structure 29 which protrudes in the direction of the cavity 2, wherein the discharge structure 29 has a support face 15, consequently a surface which circumferentially surrounds the rod 5 and which is formed on an outer side of the discharge structure 29 which faces away from the rod 5. The rod seal 7 further has an abutment portion 14 which circumferentially surrounds the rod 5 for axially supporting the rod seal 7 on the support face 15 of the discharge structure 29 which circumferentially surrounds the rod 5. The support face 15 is in this instance configured in such a manner that forces acting in an axial direction X on the support face 15, as present as a result of the pressurised medium, are discharged radially outwards.

Figure 11:
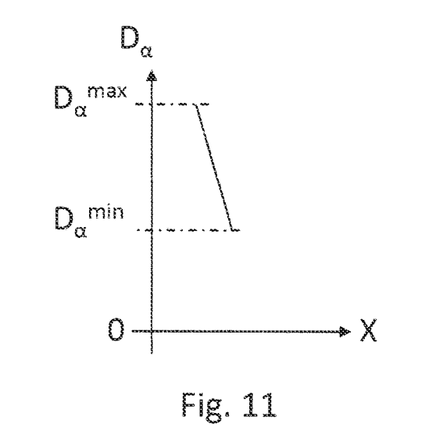
FIG. 11 shows a graph relating to a diameter of a support face of a discharge structure in accordance with the axial position.

To this end, the support face 15 has a diameter Da (see FIG. 11) which increases in the direction of the second rod portion 5b, consequently counter to the axial direction X, in particular, in a negative X direction. In specific terms, the support face 15 is constructed in such a manner that the support face 15 corresponds to the covering face of a linear truncated cone which has a circular base face and whose tip faces in the direction of the first rod portion 5a. The support face 15 is consequently a face which tapers conically in the direction of the cavity 2. An angle α enclosed by the support face 15 and the longitudinal axis 17 of the rod 5 is in this instance about 75°. Accordingly, an opening angle of the truncated cone is about 150°. The development of the diameter Da depending on the position in the axial direction X is schematically shown in FIG. 11. The diameter Da decreases as the X value increases from a maximum value $Da^{max}$ in a linear manner to a minimum value $Da^{min}$. Accordingly, the diameter Da of the support face 15 increases in the direction of the second rod portion 5b. A ratio of $Da^{max}$ to $Da^{min}$ is in this instance approximately 2.2.

Figure 2B:
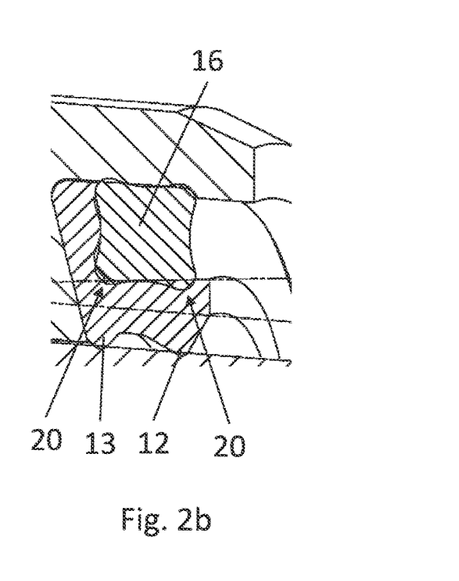
FIG. 2b shows a part-region of FIG. 2a in an enlarged illustration.
Figure 5:
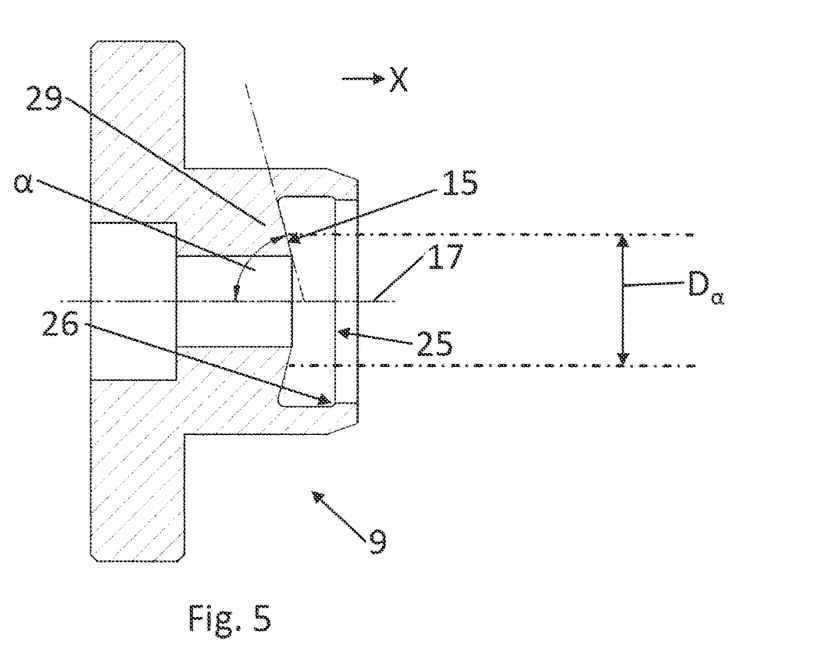
FIG. 5 shows a component of the sealing arrangement according to FIG. 2a, in particular, a bearing sleeve, as a sectioned view.

The rod seal 7 is in this instance retained so as to be fixed in position in the bearing portion 9 by means of a resiliently deformable clamping element 16 which is in the form of a quad ring 16. The quad ring 16 is circumferentially in abutment at a radially outwardly facing covering face 18, which faces away from the rod 5, of the sealing portion 11 with the sealing portion 11 and the sealing lips 12, 13 being pressed by means of projections 20 of the quad ring 16 onto the rod 5, as can be seen in particular in FIG. 2b. The quad ring 16 is additionally in abutment at a side facing away from the support face 15 with the abutment portion 14 of the rod seal 7, wherein the quad ring 16 presses the abutment portion 14 against the support face 15 of the discharge structure 29. As can be seen in particular in FIG. 5, the quad ring 16 is supported in a bearing pocket 25 which is formed between the bearing portion 9 and the rod seal 7, wherein this bearing pocket 25 is constructed to be open in the direction of the cavity 2. A part-region of the bearing portion 9 forms an undercut 26, wherein this undercut 26 engages behind the quad ring 16 at a side facing the cavity 2 and consequently fixes it in the axial direction X. The quad ring 16 completely fills this bearing pocket 25 which forms a hollow space in the installed state. Flowable medium is thereby prevented from entering this hollow space and consequently between the clamping element 16 which is in the form of a sealing ring, and in particular, a quad ring, and the rod seal 7. The clamping element 16 which is in the form of a sealing ring consequently performs two functions, in particular, the function of pressing the sealing lips 12, 13 against the rod 5 and the function of a static seal between the bearing portion 9 and the rod seal 7.

The sealing ring 16 has both in the axial dimension thereof and in the radial dimension thereof with respect to the dimensions of the bearing pocket 25 an excess dimension so that in the assembled state the sealing ring 16 is joined in the annular bearing pocket 25 with a press fit.

Figure 3:
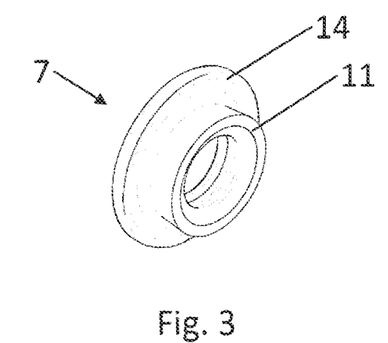
FIG. 3 shows a component of the sealing arrangement according to FIG. 2a, in particular, a rod seal as a perspective view.
Figure 4:
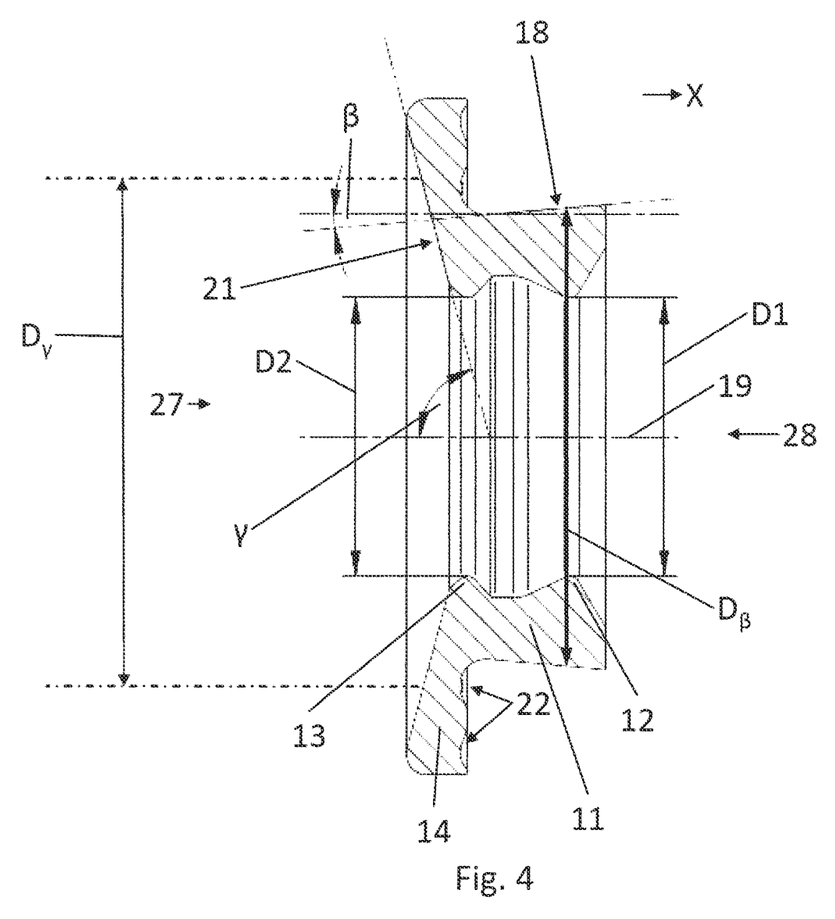
FIG. 4 shows the rod seal according to FIG. 3 as a sectioned view.

The rod seal 7 per se is best illustrated in FIG. 3 and FIG. 4 in an initial state, consequently a non-deformed state. The rod seal 7 is formed in a rotationally symmetrical manner with respect to a center axis 19 of the rod seal 7. An end face 21 which in the installed state moves into abutment with the support face 15 of the discharge structure 29 has a diameter $D_\gamma$ which decreases in the direction of the other end 28 of the two ends 27, 28. The end face 21 encloses with the center axis 19 of the rod seal 7 an angle γ which in this instance is about 75° and is consequently of the same size as the angle α. The end face 21 of the rod seal 7 and the support face 15 of the discharge structure 29 can in this instance be described by the covering face of the same truncated cone, wherein a surface normal of the end face 21 of the rod seal 7 faces radially inwards and a surface normal of the support face 15 of the discharge structure 29 faces radially outwards.

The rod seal 7 per se is configured in such a manner that the covering face 18 of the sealing portion 11 has a cross section which expands in the axial direction X in the direction of the first rod portion 5*a* and consequently in the direction of the cavity 2, wherein the covering face 18 corresponds to the covering face of a truncated cone which has a circular base face and whose tip faces in the direction of the second rod portion 5*b*. Accordingly, a diameter Dβ of the covering face 18 increases in the direction of the other end 28. An angle β enclosed by the covering face 18 of the rod seal 7 and the center axis 19 of the rod seal 7 is in this instance about 5°. When the rod seal 7 is installed in the sealing arrangement, the sealing ring 16 acts on the covering face 18 of the rod seal 7 and, with the covering face 18 of the rod seal 7 being deformed, presses the sealing lips 12, 13 against the rod 5.

As can be seen in particular in FIG. 4, the covering face 18 of the rod seal 7 and the end face 21 of the rod seal 7 are spaced apart from each other in the axial direction X and consequently do not overlap. In the axial direction X, the second sealing lip 13 is formed between the covering face 18 of the rod seal 7 and the end face 21 of the rod seal 7.

A ratio between a first inner diameter D1 in the region of the first sealing lip 12 and a second inner diameter D2 in the region of the second sealing lip 13 is in this instance about 1.0. The inner diameters D1 and D2 are in this instance slightly smaller than the diameter of the rod 5.

In the region of the abutment portion 14, the rod seal 7 has recesses 22 which are formed at the side of the abutment portion 14 facing away from the end face 21 and which circumferentially surround the center axis 19, wherein these recesses 22 serve to receive circumferential projections 20 (see FIG. 2*b*) of the quad ring 16.

Figure 6:
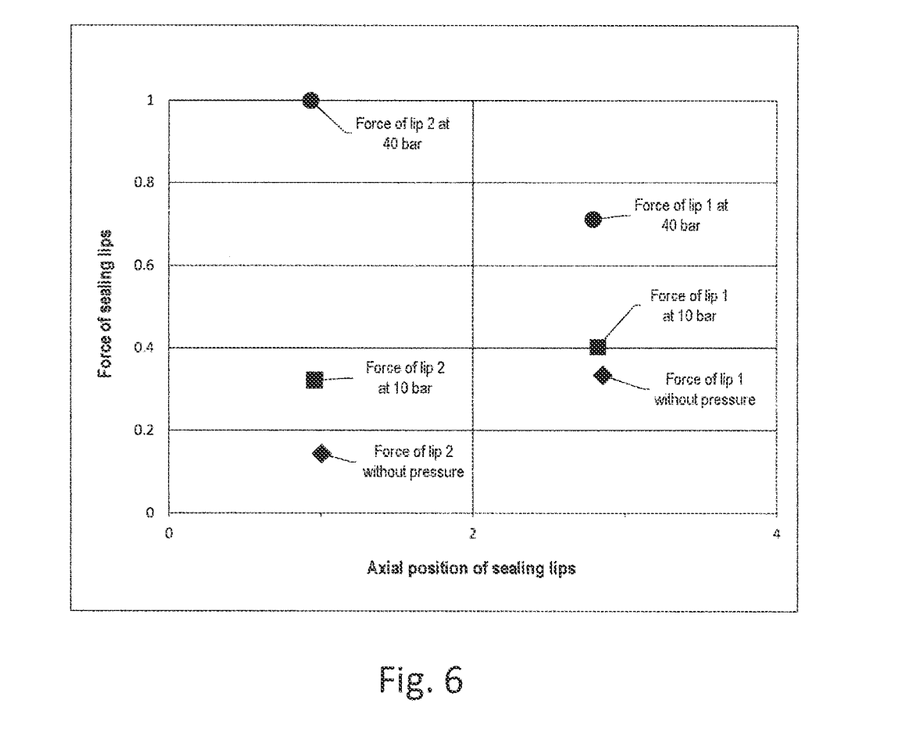
FIG. 6 shows a graph relating to a development of the cumulative lip force in the region of the respective sealing lip as the pressure of the flowable medium increases in a sealing arrangement according to FIG. 7.
Figure 8:
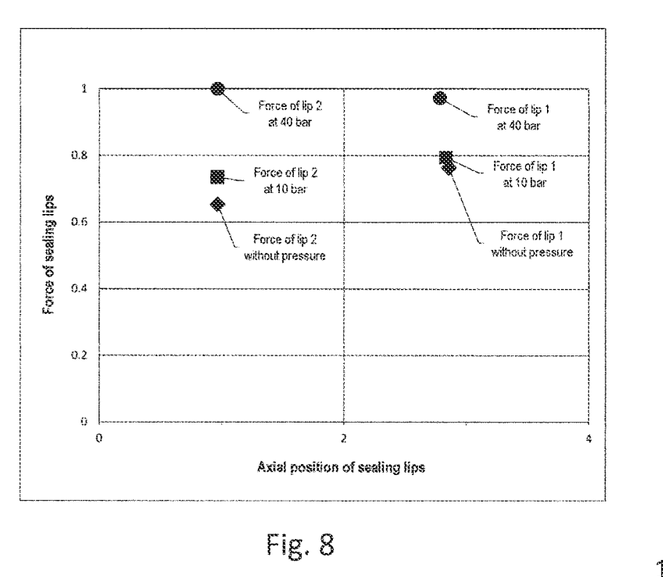
FIG. 8 shows a graph relating to a development of the cumulative lip force in the region of the respective sealing lip as the pressure of the flowable medium increases in a sealing arrangement according to FIG. 9.

The advantages of the sealing arrangement according to the invention, in particular the conical support face 15 or conical end face 21, becomes clear from a comparison of the graphs illustrated in FIG. 6 and FIG. 8.

Figure 7:
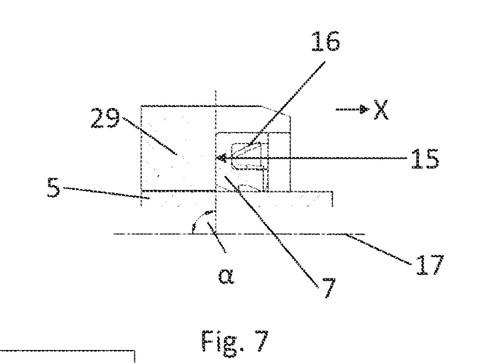
FIG. 7 shows the sealing arrangement relating to the graph in FIG. 6.

FIG. 6 relates in this instance to a sealing arrangement which in contrast to the solution according to the invention does not have a conical support face, on which the rod seal 7 is supported, but instead has a planar support face for the rod seal 7. The enclosed angle α is accordingly about 90°. The clamping element 16 is furthermore not a quad ring, but instead an annular pretensioning spring made of metal with a radially inner leg and a radially outer leg, which are connected to each other at the end. The corresponding sealing arrangement is shown schematically in FIG. 7. The graph of FIG. 6 shows the numerically totaled pressing force in the region of the first sealing lip 12 (indicated by "lip 1"), wherein the first sealing lip 12 is located in the axial direction X at the position of approximately 3.0. Furthermore, the graph of FIG. 6 shows the numerically totaled pressing force in the region of the second sealing lip 13 (indicated by "lip 2"), wherein the second sealing lip 13 is located in the axial direction X at the position of approximately 1.0. It can be seen from the graph of FIG. 6 that, as the pressure of the flowable medium increases, in this instance 0 bar ("without pressure"), 10 bar and 40 bar above ambient pressure which is approximately 1 bar, the pressing force of the two sealing lips 12, 13 on the rod 5 significantly increases. The values for the pressing force are standardised to the pressing force of the second sealing lip 13 at a medium pressure of 40 bar. In addition, the pressing force in the region of the first sealing lip 12 and the pressing force in the region of the second sealing lip 13 develop in substantially different manners. For example, the pressing force is in the region of the second sealing lip 13 at small medium pressures less than the pressing force in the region of the first sealing lip 12, whereas, at higher medium pressures, the pressing force in the region of the second sealing lip 13 exceeds the pressing force in the region of the first sealing lip 12. At low medium pressures, the pressing forces for both sealing lips 12, 13 are relatively low. They are with a pressure-free medium, consequently a medium whose pressure is not increased with respect to the ambient pressure, in the region of approximately 0.1 or 0.35. Over the pressure range from 0 bar to 40 bar which has been examined, the pressing forces change in the region of the second sealing lip 13 relatively powerfully, in particular, by a factor of 10.

Figure 9:
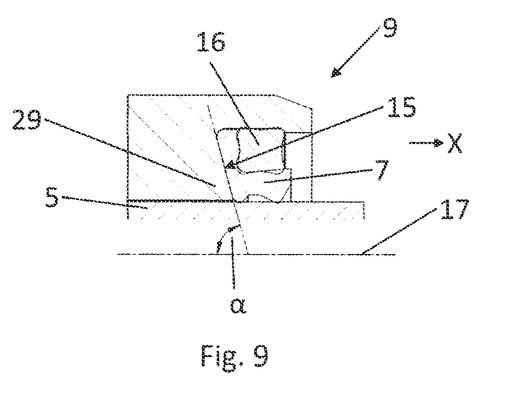
FIG. 9 shows the sealing arrangement relating to the graph in FIG. 8.

The graph of FIG. 8 relates to a sealing arrangement according to the invention according to FIG. 9. The values for the pressing force are in turn standardised to the pressing force of the second sealing lip 13 at a medium pressure of 40 bar. The absolute value of the pressing force of the second sealing lip 13 (indicated by "lip 2") at a medium pressure of 40 bar in the arrangement according to FIG. 9 is approximately identical to the absolute value of the pressing force of the second sealing lip 13 (indicated by "lip 2") at a medium pressure of 40 bar in the arrangement according to FIG. 7. The pressing forces of the first and second sealing lip 12, 13 (indicated by "lip 1" and "lip 2") increase in the arrangement according to FIG. 9 in a similar manner as the medium pressure increases. In addition, even with relatively low medium pressure, a sufficiently high pressing force is ensured between the rod 5 and the first sealing lip 12 and the second sealing lip 13. This is at 0 bar medium pressure in the region of 0.6 or 0.8.

The solution according to the invention consequently affords the advantage that the pressing force between the rod 5 and the first sealing lip 12 and the second sealing lip 13 is also sufficient at low pressures to prevent a leakage and/or a tipping of the sealing lips 12, 13 and at the same time as the medium pressure increases the pressing force between the first sealing lip 12 or the second sealing lip 13 and the rod 5 does not increase excessively and also does not increase in a non-homogeneous manner. Excessively powerful wear of the rod seal 7 in the region of the sealing lips 12, 13 as a result of an excessively high pressing force is thereby prevented. Over the pressure range of from 0 bar to 40 bar which has been examined, the pressing forces in the solution according to the invention change in the region of the second sealing lip 13 relatively little, that is to say, only in the range from approximately 0.6 to approximately 1.0, whereas with the solution according to FIG. 7 the pressing force in the region of the second sealing lip 13 changes from about 0.1 to about 1.0.

The quad ring 16 ensures as a pretensioning element that already in the pressure-free state or at low medium pressures a uniform pretensioning of both sealing lips 12, 13 is ensured. Furthermore, the quad ring 16 prevents flowable medium from reaching the region of the abutment portion 14 and consequently acting on the abutment portion 14, whereby the dependency of the sealing action of the rod seal 7 on the medium pressure applied is further reduced.

The invention claimed is:

1. A sealing arrangement for an output apparatus for discharging a flowable medium, the sealing arrangement having a rod seal for sealing a cavity formed in a housing and configured to receive the flowable medium in the region of a rod, wherein the rod is movably supported in the housing to be displaced in an axial direction of the rod, wherein the housing has a bearing portion, wherein the rod seal is supported in a fixed manner in the bearing portion, wherein the rod extends through the bearing portion and the rod seal so that a first rod portion of the rod and a second rod portion of the rod are arranged at different sides of the bearing portion, wherein the first rod portion is located at a side of the bearing portion facing the cavity and wherein the second rod portion is located at a side of the bearing portion facing away from the cavity, wherein the rod seal is arranged at the side of the bearing portion facing the cavity, wherein the rod seal has a first sealing lip and a second sealing lip, wherein the first sealing lip and the second sealing lip are spaced apart from each other in the axial direction, wherein the first sealing lip and the second sealing lip circumferentially contact the rod, wherein the bearing portion has at a side thereof facing the cavity a discharge structure having a support face which circumferentially surrounds the rod, wherein the rod seal is in abutment with the support face, and wherein a diameter of the support face increases in the direction of the second rod portion, the sealing arrangement having a resiliently deformable clamping element, wherein the clamping element is in circumferential abutment with the rod seal on a covering face of the rod seal facing away from the rod and presses the first sealing lip and the second sealing lip against the rod, and wherein the covering face of the rod seal, with which the clamping element is in abutment, in an initial state of the rod seal, consequently in a non-deformed state, has a diameter which increases in the direction of the first rod portion, wherein the clamping element has two radially inwardly protruding projections and the clamping element is arranged such that one projection of the two radially inwardly protruding projections acts on the first sealing lip in such a manner that the first sealing lip is pressed against the rod and the other projection of the two radially inwardly protruding projections acts on the second sealing lip in such a manner that the second sealing lip is pressed against the rod, and wherein the two radially inwardly protruding projections contact the rod seal in a region of the covering face of the rod seal having the increasing diameter, such that a diameter of the covering face of the rod seal that is in contact with the one projection of the two radially inwardly protruding projections is smaller than a diameter of the covering face of the rod seal that is in contact with the other projection of the two radially inwardly protruding projections.

2. The sealing arrangement according to claim 1, wherein an angle enclosed by the support face and a longitudinal axis of the rod which extends in the axial direction is from about 60° to about 85°.

3. The sealing arrangement according to claim 1, wherein the support face corresponds to a covering face of a truncated cone having a circular base face, and wherein an angle between a surface line of the truncated cone and a cone axis of the truncated cone is from about 60° to about 85°.

4. The sealing arrangement according to claim 1, wherein the clamping element is in abutment with the rod seal at a side of the rod seal facing away from the support face of the discharge structure and presses an abutment portion of the rod seal formed between the support face of the discharge structure and the clamping element against the support face of the discharge structure.

5. The sealing arrangement according to claim 1, wherein the support face of the discharge structure is described by a rotation face which is produced by means of rotation of a line about a rotation axis formed by a longitudinal axis of the rod.

6. The sealing arrangement according to claim 1, wherein the clamping element is supported in a bearing pocket formed by the bearing portion and/or by the rod seal, and wherein a part-region of the bearing portion engages behind the clamping element at a side facing the first rod portion.

7. The sealing arrangement according to claim 1, wherein a material of the clamping element has a lower Shore hardness than a material of the rod seal, and wherein the material of the rod seal has a hardness of from about 50 Shore D to about 65 Shore D and/or the material of the clamping element has a hardness of from about 60 Shore A to about 80 Shore A.

8. The sealing arrangement according to claim 1, wherein the clamping element is in the form of a sealing ring having in cross section four projections in the form of an X ring or a quad ring.

9. The sealing arrangement according to claim 1, wherein the clamping element contacts the bearing portion at a radially outer side.

10. The sealing arrangement according to claim 1, wherein a hollow space which is open in the direction of the cavity is formed between the rod seal and the bearing portion or alternatively wherein the rod seal has a hollow space which is open in the direction of the cavity, and wherein the clamping element seals the hollow space with respect to the cavity.

11. An output apparatus for discharging a flowable medium having the sealing arrangement according to claim 1, wherein the output apparatus has a discharge opening which opens in the cavity for discharging the flowable medium from the cavity, wherein the rod is supported in the housing so as to be movable between a first end position and a second end position in the axial direction, wherein the rod has a sealing portion, wherein the sealing portion closes the discharge opening in the first end position and is spaced apart from the discharge opening in the second end position, and wherein the output apparatus has a drive operationally connected to the second rod portion of the rod to move the rod between the first end position and the second end position.

12. A rod seal for use in a sealing arrangement, wherein the rod seal has a center axis which extends in an axial direction, wherein at least two radially inwardly directed sealing lips comprising a first sealing lip and a second sealing lip are spaced apart from each other in the axial direction and circumferentially surround the center axis, wherein the rod seal has two ends which are opposite each other in the axial direction, wherein an end-side abutment portion of the rod seal has an end face which circumferentially surrounds the center axis for an end-side support of the rod seal on a support face of the sealing arrangement, wherein a diameter of the end face decreases in the direction of one end of the two ends, wherein the rod seal at a side facing away from the center axis has a covering face which circumferentially surrounds the center axis, wherein a diameter of the covering face increases in the direction of the other end of the two ends, and wherein the covering face corresponds to the covering face of a truncated cone with a circular base face, wherein a clamping element of the sealing arrangement has two radially inwardly protruding projections such that one projection acts on the first sealing lip in such a manner that the first sealing lip is pressed towards the center axis and the other projection acts on the second sealing lip in such a manner that the second sealing lip is pressed towards the center axis, and wherein the two radially inwardly protruding projections contact the rod seal in a region of the covering face of the rod seal having the increasing diameter, such that a diameter of the covering face of the rod seal that is in contact with the one projection is smaller than a diameter of the covering face of the rod seal that is in contact with the other projection.

13. The rod seal according to claim 12, wherein an angle enclosed by the end face and the center axis of the rod seal is from about 60° to about 85° and/or an angle enclosed by the covering face and the center axis of the rod seal is from about 2° to about 15°.

* * * * *